Figure 1:
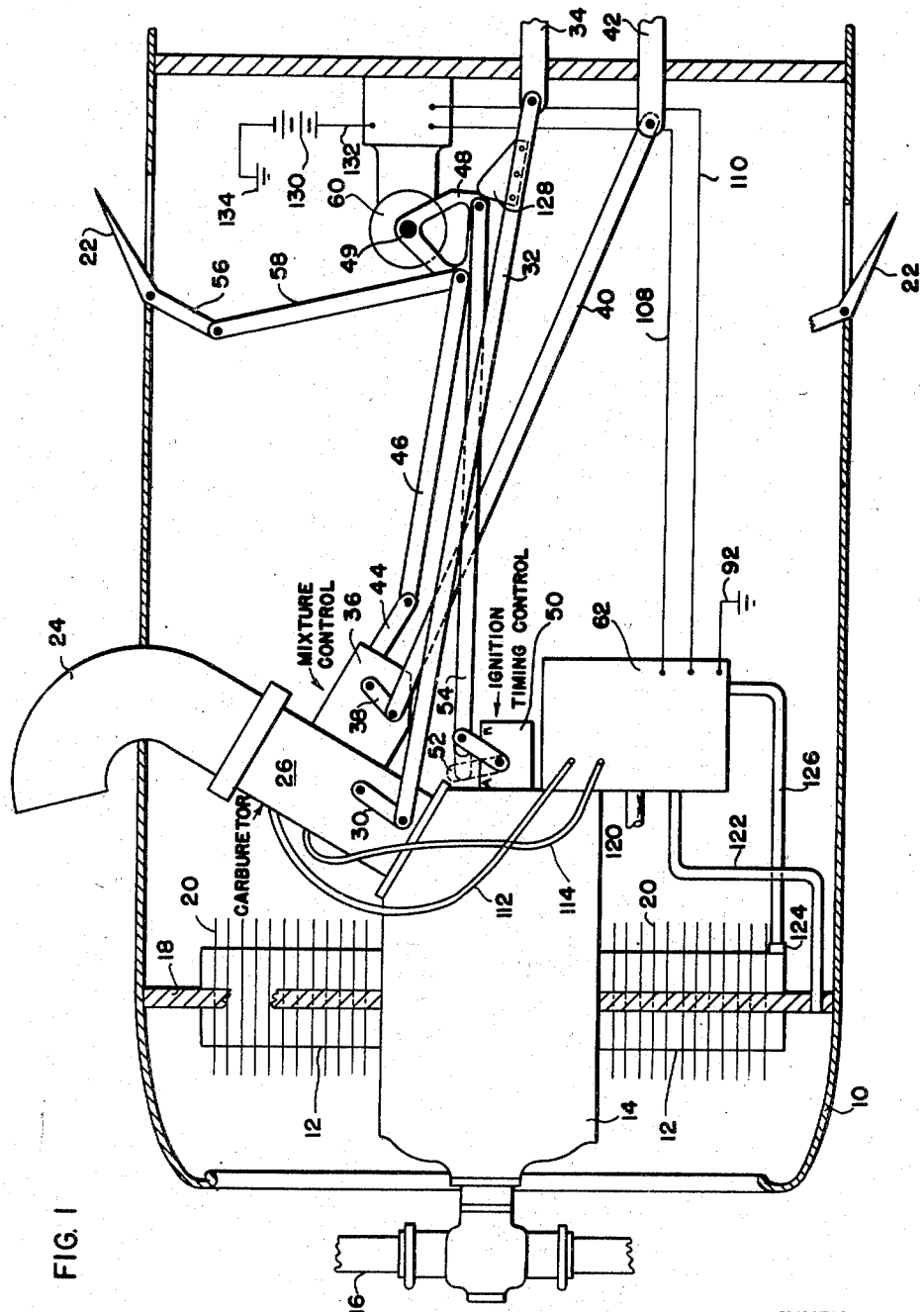

Aug. 8, 1950 L. LEE, II 2,517,688
CONTROL APPARATUS FOR INTERNAL-COMBUSTION ENGINES
Filed Dec. 6, 1945 5 Sheets-Sheet 1

INVENTOR.
LEIGHTON LEE II
BY Lester W Clark
AGENT

Aug. 8, 1950

L. LEE, II 2,517,688

CONTROL APPARATUS FOR INTERNAL-COMBUSTION ENGINES

Filed Dec. 6, 1945

5 Sheets-Sheet 2

INVENTOR.
LEIGHTON LEE II
BY
AGENT

Patented Aug. 8, 1950

2,517,688

UNITED STATES PATENT OFFICE 2,517,688

CONTROL APPARATUS FOR INTERNAL-COMBUSTION ENGINES

Leighton Lee, II, West Hartford, Conn., assignor, by mesne assignments, to Niles-Bement-Pond Company, West Hartford, Conn., a corporation of New Jersey Application December 6, 1945, Serial No. 633,169

28 Claims. (Cl. 123—171)

The present invention relates to control apparatus for internal combustion engines and is particularly adapted for use with aircraft engines.

Internal combustion engines operate most efficiently at a certain optimum temperature. There are several factors which govern the operating temperature of the engine. Among these factors are the power output of the engine and the rate of flow of cooling medium past the engine. In order to control the temperature of the engine, several different devices may be employed. The rate of flow of cooling medium past the engine is commonly regulated so as to control the engine temperature. Since an engine runs cooler on a rich mixture of fuel and air than on a lean mixture, it has been proposed to enrich the mixture at high power outputs so as to limit the rise in temperature of the engine. It is also possible to limit the engine temperature rise by positively limiting the maximum power output. Ignition timing also has an effect on engine temperature, and it may be varied in accordance with the operating conditions of the engine for the purpose of regulating the engine temperature.

It is an object of the present invention to provide control apparatus for an internal combustion engine which coordinates all the various conditions and devices which may affect engine temperature to maintain an optimum engine temperature and maximum thermal efficiency.

Another object of the present invention is to provide, for an air-cooled engine, an arrangement wherein the cowl flaps which control the passage of cooling air past the engine and the fuel-air ratio regulating apparatus are coordinated.

A further object is to provide such an arrangement wherein the cowl flaps and the fuel-air ratio are coordinated in response to:

(1) Engine temperature
(2) Rate of cooling air flow
(3) Rate of combustion air flow Another object is to provide an arrangement of the type described wherein the ignition timing is coordinated with the other control elements described.

A further object is to provide an arrangement wherein a power output limiting mechanism is coordinated with the other elements described.

Another object is to provide improved apparatus for controlling a servomotor in response to a plurality of variable conditions.

Another object is to provide improved mechanism for varying the fuel-air ratio in a carburetor for an internal combustion engine.

A further object is to provide means for controlling various factors affecting engine temperature in response to conditions which indicate future changes in engine temperature, so as to anticipate such changes and maintain said temperature relatively constant.

A further object is to provide apparatus for controlling the flow of cooling air over an air-cooled engine in response to a condition indicative of the power output of said engine.

A further object is to regulate the cowl flaps which control the flow of cooling air over an aircraft engine so as to minimize the drag produced by the flaps and tending to slow the aircraft.

A further object is to control various factors affecting the operation of an internal combustion engine so as to operate said engine substantially without detonation.

Figure 2:
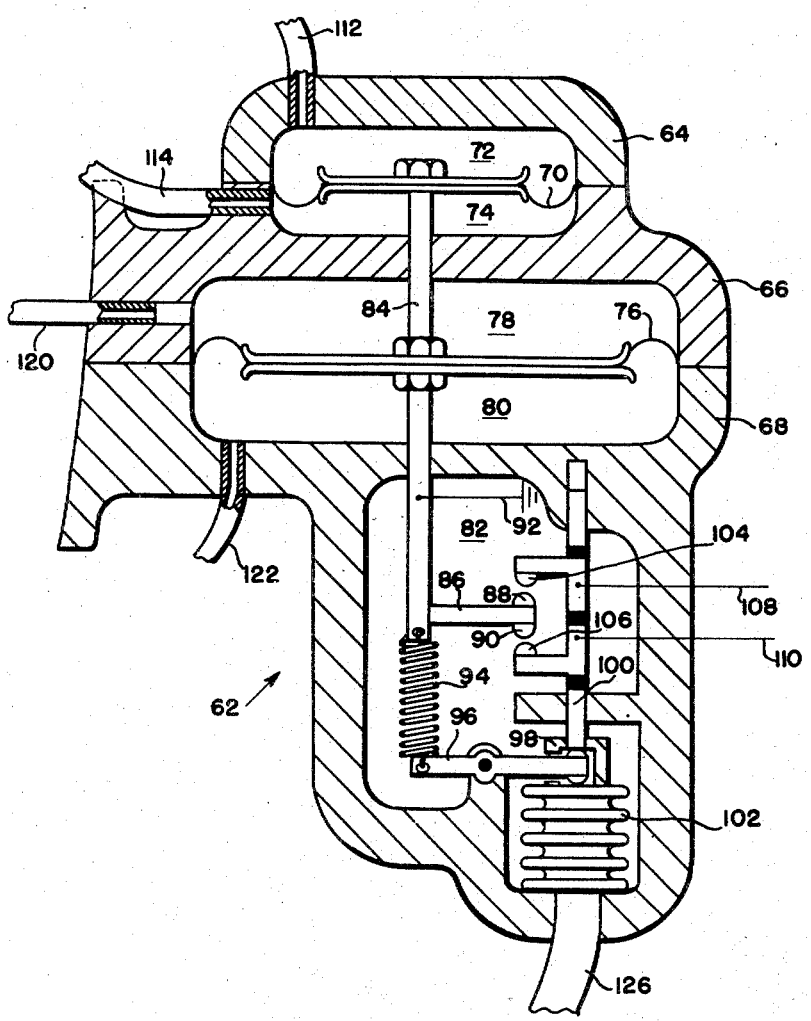
Figure 3:
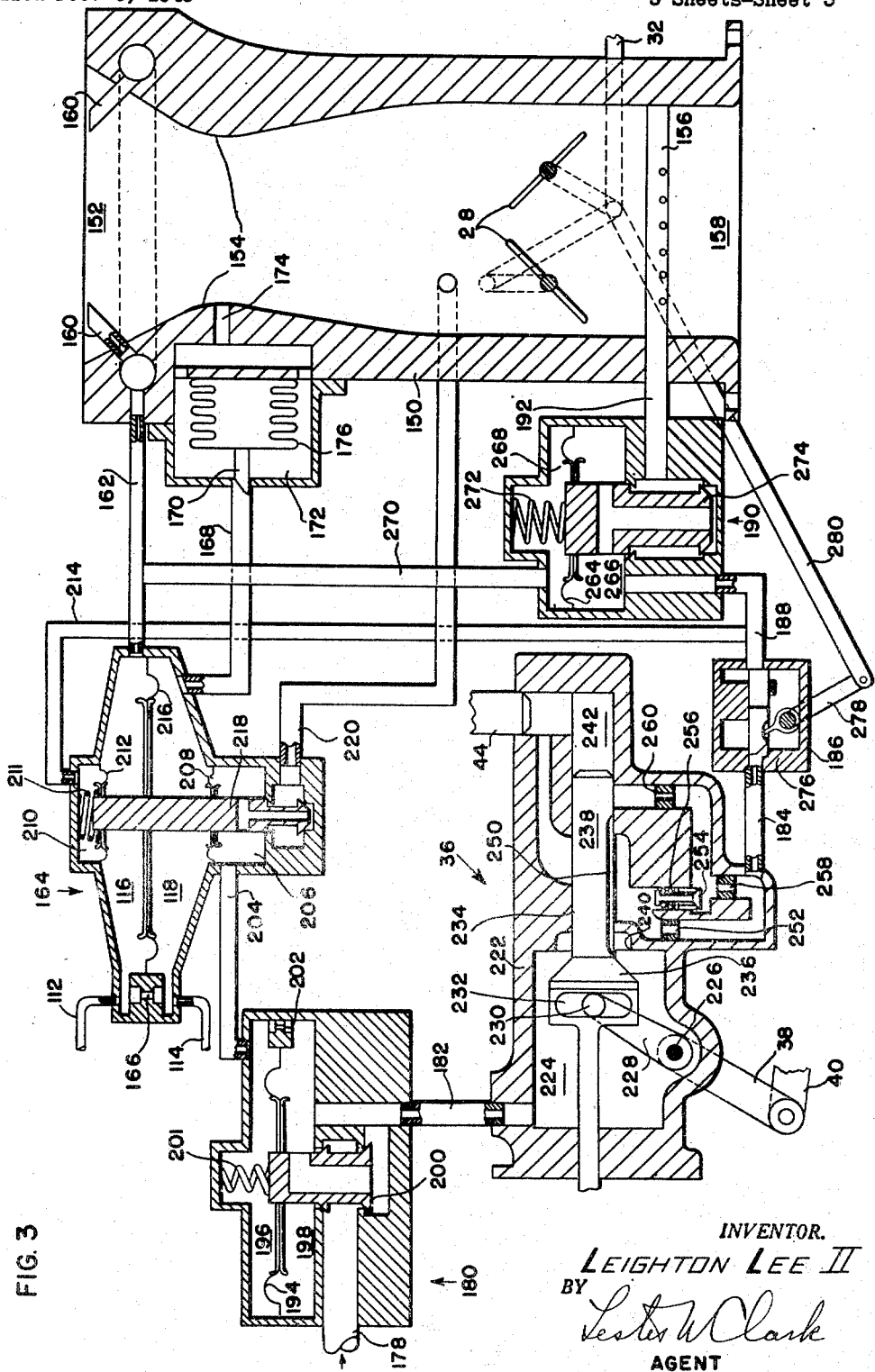
Figure 4:
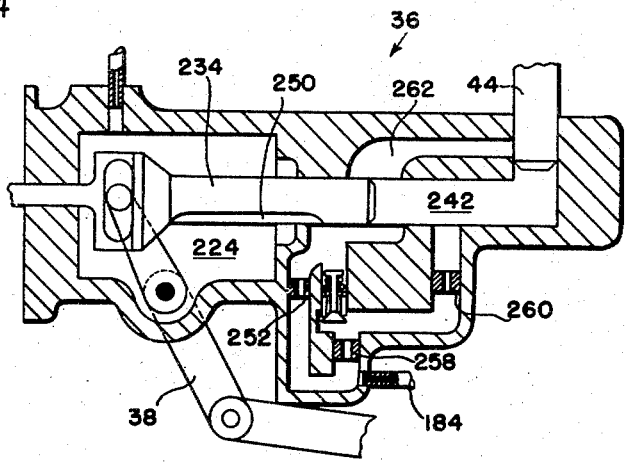
Figure 5:
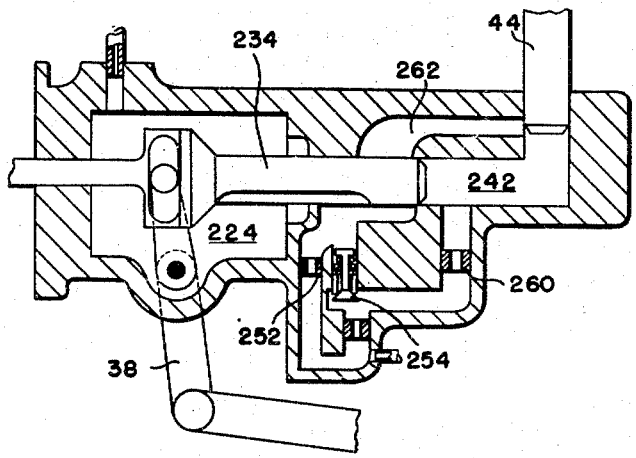
Figure 6:
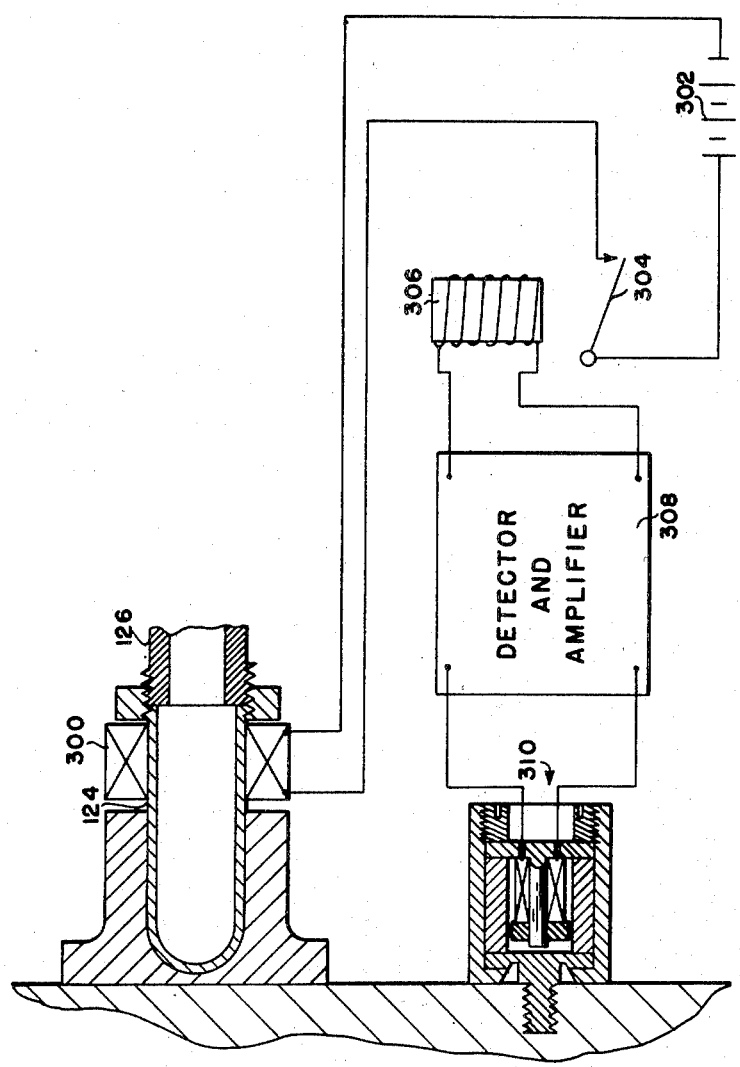

Other objects and advantages of the present invention will become apparent from a consideration of the appended specification, claims and drawings, in which:

Figure 1 is a more or less diagrammatic view, partly in section, of an aircraft engine including control apparatus built in accordance with the present invention, Figure 2 is a cross-sectional view of a motor controlling switch mechanism such as that illustrated schematically in Figure 1, Figure 3 is a diagrammatic illustration of a carburetor such as that shown schematically in Figure 1, illustrating the important structural details of the carburetor, Figures 4 and 5 show different positions of the mixture control mechanism of the carburetor of Figure 3, and Figure 6 shows a detonation responsive device adapted for use in the apparatus of Figure 1.

Referring to Figure 1, there is shown an aircraft engine nacelle 10, in which is mounted an engine including a plurality of cylinders 12 and a crankcase 14. The engine is disposed in driving relationship with the propeller 16. The engine is of the well-known radial air-cooled type. Air enters the nacelle at the front, just in back of the propeller and is directed by means of a baffle plate 18 thru passages between cooling fins 20 on the cylinders 12. After flowing past the cooling fins, the air passes backwardly thru the nacelle and flows out thru discharge openings controlled by cowl flaps 22.

The baffle plate 18 and the cooling fins 20 form a fixed restriction in the path of the cooling air. Since the pressure drop across a fixed restriction in a fluid conduit is a measure of the rate of flow of fluid thru it, the pressure drop across this restriction, may be used as a measure of the rate of flow of cooling air past the engine.

Air for combustion purposes enters a scoop 24 and passes thru a carburetor 26, and then into the engine. The rate of flow of combustion air thru the carburetor may be controlled by a pair of throttle blades 28 (see Figure 3), which are inter-linked for concurrent rotation in opposite directions. These blades may be moved by a linkage 30, 32, 34 which leads to the pilot's throttle lever in the cockpit of the aircraft.

The carburetor is provided with a mixture control unit 36, to which is connected a manual operating linkage 38, 40, 42, which also leads to an operating lever in the pilot's cockpit. The mixture control 36 is also provided with an automatic mixture regulating device including a rod 44 and a link 46 which connects the rod to a rotatable frame 48.

An ignition timing control device is schematically indicated at 50. This device is operated thru links 52, 54 which also connect to the frame 48.

The cowl flaps 22 are also connected by means of links such as those shown at 56 and 58 to frame 48.

The frame 48 is rotated by an electric motor generally indicated at 60. The motor 60 is reversible and is controlled by a switch mechanism generally indicated at 62. The details of the switch mechanism 62 are shown in Figure 2. As there shown, the switch mechanism 62 includes a housing separated into three sections, 64, 66 and 68. The sections 64 and 66 are recessed to provide between them a chamber which is divided by a flexible diaphragm 70 into two expansible chambers 72 and 74. The housing sections 66 and 68 are similarly recessed to provide between them a chamber which is divided by a flexible diaphragm 76 into expansible chambers 78 and 80. A chamber 82 is formed in the housing section 68. A rod 84 is attached to the diaphragms 70 and 76 and extends slidably thru the walls of the housing sections and into the chamber 82. At its lower end, the rod 84 carries an arm 86 provided at its extremity with oppositely disposed contacts 88 and 90. The rod 84 is connected to ground as indicated at 92. A tension spring 94 is attached to the lower end of rod 84 and extends to one end of a lever 96. The other end of lever 96 is connected thru a joint 98 to a switch operating rod 100. The joint 98 and rod 100 are positioned by an expansible bellows 102. The rod 100 carries a pair of spaced contacts 104 and 106, which lie on either side of the arm 86 carrying contacts 88 and 90. Contact 104 is connected to a conductor 108 and the contact 106 is connected to a conductor 110.

The chambers 72 and 74 are connected respectively thru conduits 112 and 114 to a pair of chambers 116 and 118 (see Figure 3) in the carburetor 26 where a pressure differential is maintained which is a measure of the rate of flow of combustion air to the engine. This pressure differential acts downwardly on diaphragm 70. Chamber 78 is connected thru a conduit 120 to the air space in back of the baffle plate 18. Chamber 80 is connected thru a conduit 122 to the air space in front of the baffle plate 18. There is thereby applied to the diaphragm 76, in an upward direction, a pressure differential which is a measure of the rate of flow of cooling air over the engine.

A bulb 124 is mounted on one of the engine cylinders and is connected thru a conduit 126 to the bellows 102. The bulb 124 is filled with a suitable temperature responsive fluid, such as one having a high vapor pressure, so that the bellows 102 expands and contracts with variations in the engine temperature. An increase in the engine temperature causes the bellows 102 to expand, thereby causing engagement of contacts 90 and 106. A decrease in engine temperature causes bellows 102 to contract, thereby moving contact 104 downwardly and tending to engage it with contact 88. At the same time the motion of the free end of bellows 102 is transmitted thru lever 96 and spring 94 to the rod 84, where it tends to move the contacts 88 and 90 to cause engagement of those contacts with the contacts 104 and 106, respectively, sooner than would otherwise be the case. By virtue of the connection of bellows 102 thru lever 96 to rod 84, the travel of the bellows required to produce a given change in the cowl baffle drop is substantially reduced below the travel which would be required if the bellows only positioned contacts 104 and 106.

It may also be observed that an increase in combustion air flowing to the engine, which indicates that the engine temperature will increase, moves the rod 84 downwardly to cause engagement of contacts 90 and 106. An increase in cooling air flow over the engine, which anticipates a decrease in engine temperature causes the rod 84 to move upwardly, thereby engaging contacts 88 and 104.

When the temperature of the engine increases, the contact 106 is moved toward engagement with contact 90. Likewise, whenever the combustion air flow or the cooling air flow changes in a direction which anticipates an increase in temperature, the same two contacts are moved toward engagement. On the other hand, when the engine temperature decreases, or when the combustion air flow or cooling air flow changes in a direction to anticipate a decrease in the engine temperature, contacts 88 and 104 are moved into engagement.

Engagement of contacts 90 and 106 closes an electrical circuit which may be traced (see Figure 1) from the lower terminal of a battery 130 thru a conductor 132, motor 60, conductor 110, contact 106, contact 90, and ground connections 92 and 134 to the upper terminal of battery 130. This circuit energizes motor 60 for rotation in a direction to drive the frame 48 counter-clockwise about its pivot 49 so as to open the cowl flaps.

Engagement of contacts 88 and 104 completes a circuit which may be traced from the lower terminal of battery 130 thru conductor 132, motor 60, conductor 108, contact 104, contact 88, and ground connections 92 and 134 to the upper terminal of battery 130. This circuit energizes motor 60 for rotation in a direction to drive the frame 48 clockwise, thereby closing the cowl flaps 22.

When the frame 48 is driven clockwise, then the mixture control is operated to lean the mixture and the ignition timing control is operated to advance the timing. At the same time, frame 48 moves out of the path of stop 128, thereby allowing the throttle to move to a wider open position.

When the frame 48 moves in counter-clockwise direction, the cowl flaps are opened, the mixture is enriched, the ignition is retarded and the opening movement of the throttle is increasingly limited.

When the frame 48 turns clockwise, the cooling air flow, the mixture ratio and the ignition timing are all varied in a direction to increase the engine temperature. When it rotates counter-clockwise, those conditions are varied in a sense to decrease the engine temperature. The throttle limit stop is moved at the same time to permit a greater throttle opening and hence greater power output when the engine temperature is low and to reduce the power output when the engine temperature is high.

An engine runs more efficiently when the mixture is lean (within reasonable limits) than when the mixture is rich. An engine can be run on a leaner mixture when the ignition is advanced than when it is retarded. Both the leaner mixture and the advancing of the ignition tend to make the engine run hotter. The present control system is arranged to allow the engine to run as economically as possible consistent with safe operating temperatures. If the selected operating temperature is exceeded, the system operates the cowl flaps to increase the cooling, and at the same time enriches the mixture and retards the ignition timing to decrease the heat output of the engine. If the engine temperature falls below that selected by adjustment of the system, then the system acts to lean the mixture and advance the timing so as to take advantage of the greater economy permitted by the lower temperature.

If the flaps come near their full open position and the temperature continues to increase, the throttle stop comes into play to limit the power output (and hence the heat output) of the engine.

By positioning the cowl flaps in response to the rate of flow of combustion air to the engine and the rate of flow cooling air to the engine, I have provided a system which maintains the flaps as nearly closed as possible for any given condition of engine power output, since combustion air flow may be used as a measure of power output. Therefore, the drag due to the cowl flaps which tends to slow the aircraft is reduced to the minimum possible for any given engine power output condition.

From the foregoing, it may be seen that in my improved control apparatus, factors which influence the engine temperature, such as mixture ratio, ignition timing, and rate of cooling air flow, are controlled in response to other conditions whose variation indicates a future change in engine temperature, such as combustion air flow and cooling air flow. The system therefore anticipates changes in engine temperature and applies corrective measures before the changes start, thereby obtaining a more even temperature.

*Figure 3*

There is shown in detail in Figure 3 a carburetor which may be that shown schematically at 26 in Figure 1. This carburetor has a mixture control 36 which may be the same as that shown schematically in Figure 1.

There is shown an air induction passage 150, thru which the air flows from an entrance 152, past a venturi 154, throttle blades 28, and a fuel discharge nozzle 156 to an outlet 158. The venturi 154 sets up an air pressure differential which is a measure of the velocity of the air flowing thru the air induction passage.

A portion of the air flows thru a secondary air passage. The entrance of this secondary air passage is at a plurality of impact tubes 160 whose open ends project into the air entrance 152 in a direction to receive the impact of the entering air. From the impact tubes 160, the air flows thru a conduit 162 into a chamber 116 which is located in a fuel meter 164. From the chamber 116, the air flows thru a restriction 166 into chamber 118, which is also located in the fuel meter 164. The air then flows from chamber 118 thru a conduit 168, past a valve 170 into a chamber 172. Chamber 172 is connected thru a passage 174 to the throat of venturi 154. The valve 170 is operated by a bellows 176 mounted in the chamber 172.

The bellows 176 serves to modify the pressure drop across restriction 166 in accordance with varying density of the air flowing thru the air induction passage 150. In this way the pressure drop across restriction 166 may be made to vary in accordance with the mass of air flowing per unit time thru the air induction passage, rather than in accordance with the velocity of flow. This effect is described in detail in the co-pending application of Milton E. Chandler, Serial No. 490,281, filed June 10, 1943, now Patent No. 2,393,144, issued January 15, 1946.

Fuel enters the carburetor from a pump (not shown) and flows thru a conduit 178, a fuel regulator 180, a conduit 182, the mixture control unit 36, a conduit 184, an idle valve mechanism 186, a conduit 188, a pressure regulator 190 and a conduit 192 to the fuel nozzle 156.

The fuel regulator 180 includes a diaphragm 194 separating a pair of expansible chambers 196 and 198. A valve 200 is attached to the center of diaphragm 194. Chambers 196 and 198 are inter-connected thru a restriction 202. The valve 200 is balanced against the pressure in the inlet conduit 178. The outlet conduit 182 is connected to chamber 198. Chamber 196 is connected thru a conduit 204 to a chamber 206 in the fuel meter 164. Diaphragm 208 separates chamber 206 from chamber 118.

The fuel meter 164 also includes a fourth chamber 210 separated from chamber 116 by a diaphragm 212. The chamber 210 is connected thru a conduit 214 to the fuel conduit 188. A diaphragm 216 separates the two chambers 116 and 118. The diaphragms 212, 216 and 208 are attached at their centers to a pilot valve 218, which controls the flow of fuel from chamber 206 to an outlet conduit 220 which delivers the fuel flowing therethru into the main air induction conduit. A spring 211 biases the valve 218 toward closed position.

The fuel regulator 180 operates the valve 200 to maintain a pressure in chamber 198 which varies with the pressure in chamber 196. If the pressure in chamber 196 increases, the valve 200 is moved downwardly, thereby permitting additional fuel to flow into chamber 198 until the increase in pressure therein balances the increased pressure in chamber 196. The pressure in chamber 196 may therefore be said to be a measure of the pressure in chamber 198, which is the pressure in the main fuel conduit on the upstream side of the mixture control 36. This pressure is transmitted into chamber 206 in the fuel meter 164 where it acts upwardly on the valve 218. The pressure in conduit 188 on the downstream side of the mixture control 36 is transmitted thru conduit 214 to the chamber 210. The difference in pressure between chambers 206 and 210 is therefore a measure of the fuel pressure drop across the mixture control 36. It may be seen that the valve 218 is positioned in accordance with the balance or unbalance between two differential pressures, one of which is a measure of the mass of air flowing to the engine per unit time and the other of which is a measure of the rate of fuel flow to the engine. The position of valve 218 in turn controls the pressure in chamber 196. Therefore the fuel meter 164 and the fuel regulator 180 control the fuel pressure on the upstream side of the mixture control unit 36 in proportion to the mass of air flowing to the engine.

The pressure regulator 190 acts to maintain a substantially constant pressure on the downstream side of the mixture control 36. The pressure regulator 190 includes a diaphragm 264 separating a pair of chambers 266 and 268. Chamber 266 receives fuel from the conduit 188. Chamber 268 is vented thru a conduit 270 to conduit 162 and the air entrance 152. A spring 272 biases a valve 274 attached to the center of diaphragm 264 toward closed position. The valve 274 may be balanced against outlet pressure, if desired. In any event, it operates to maintain a substantially constant pressure in the chamber 266, which pressure is determined by the strength of spring 272.

Since the pressure on the downstream side of the mixture control unit is maintained constant, and the pressure on the upstream side is varied in accordance with the rate of air flow, it may be seen that the pressure differential across the mixture control unit varies in accordance with the rate of air flow. Therefore, a substantially constant fuel-air ratio is maintained.

The ratio of fuel to air may be varied by varying the effective metering area of the flow paths thru the mixture control system. This may be done either by manipulating the manual mixture control link 38 or thru the action of the automatic mixture control rod 44.

The mixture control 36 includes a casing 222 having formed therein an inlet chamber 224 connected to the conduit 182. The manual mixture control link 38 rotates a shaft 226, which carries an arm 228 within the chamber 224. The end of arm 228 carries a pin 230 which rides in a slot 232 formed transversely on a valve 234. The valve 234 has a tapered valve portion 236, and an elongated valve portion 238. The tapered valve portion 236 cooperates with a seat 240 to control the flow of fuel out of the chamber 224. The elongated valve portion 238 extends thru the seat 240 and moves in a passage 242. The elongated portion 238 is fluted as at 250 to permit the flow of fuel thru the seat 240 whenever the tapered portion 236 is away from the seat. When the valve 234 is in the position shown in Figure 3, fuel can flow thru the mixture control only from chamber 224 thru the flute 250, and thence thru a restriction 252 to the conduit 184. Fuel may also flow thru the flute 250 and thru a valve 254 biased to closed position by a spring 245, and then thru a restriction 258 to the conduit 184. The valve 254 is subject to the fuel pressure differential across the jet system and opens at high fuel flows to enrich the fuel-air mixture. The position of the valve 234 shown in Figure 3 is known as the "lean" position of the mixture control.

The manual mixture control link 38 may be moved to the position shown in Figure 4, which is known as the "rich" position. Referring to Figure 4, it will be seen that all the fuel passages which were open in Figure 3 are open and that the fuel may also flow from the flute 250, thru passage 242, a restriction 260 and the restriction 258 to the conduit 184. By the movement of the valve 234, the restriction 260 has in effect been placed in parallel with the restriction 252. The fuel-air ratio is increased since the total metering area of the restrictions in the mixture control has been increased, thereby increasing the rate of fuel flow for a given fuel pressure differential across the mixture control system.

In Figure 5, the valve 234 has been moved to an intermediate position known as the "automatic" position. In this position of the manual control link 38, the effective metering area of the mixture control is determined by the position of the automatic mixture control rod 44. The fuel passages thru restriction 252 and thru valve 254 are open as they are in Figure 3. Fuel may also now pass thru restriction 260, but only by first passing thru a by-pass conduit 262 whose effective area is controlled by the position of the mixture control rod 44. The fuel-air ratio obtained under these conditions is somewhere between that which would be obtained by the control in its "lean" position and that which would be obtained by the control in its "rich" position.

Under low air flow conditions, such as those encountered when the engine is idling, the venturi 154 is not accurate as a device for measuring the air flow. Under those conditions it is desirable to have the fuel flow determined in accordance with the throttle position, rather than in accordance with the measurement of the venturi. For this purpose, there is provided the idle valve mechanism 186. This mechanism includes a valve 276, which is operated by a lever 278 connected by a link 280 to the throttle operating link 32. As the throttle moves toward closed position the valve 276 is moved to restrict the conduit 184. The valve 276 then becomes the dominant restriction in the fuel conduit since its effective metering area is then smaller than that of restriction 252. It will be observed that the pilot valve 218 is biased toward closed position by a spring 211 and that valve 200 is biased open by a spring 201. Both of these springs act in a sense to increase the flow thru the main fuel conduit. When the pressure differential set up by the air venturi is small, as under idle conditions, these two springs determine the pressure differential across the mixture control 36 and the idle valve 276 in series. The idle valve 276 determines the effective metering area at such times. The fuel flow is therefore determined by the throttle position and by the characteristics of springs 201 and 211 under idle conditions.

Figure 6

There is shown in Figure 6 an arrangement for additionally controlling the system of Figure 1 in response to detonation of the engine. Referring to Figure 6, the reference character 124 represents the temperature bulb indicated by the same character in Figure 1. The conduit 126 is connected to it as in Figure 1. A heater coil 300 surrounds a portion of the bulb. This heater coil is connected in an electrical circuit including a battery 302 and a switch 304, operated by a relay 306. The energization of relay 306 is controlled by an amplifier 308; to the input terminals of the amplifier 308 is connected a detonation responsive pickup unit 310. This pickup unit may be, for example, the same as that shown in the patent to Draper et al., No. 2,275,675. Upon detonation of the engine, this arrangement responds to energize the relay 306, thereby closing the circuit thru the heater coil 300. This causes the fluid in the bulb 124 to expand giving an indication of higher engine temperature than actually exists. The system of Figure 1 responds therefore to detonation in the same way that it responds to an increase in engine temperature. The cowl flap opening is increased, the fuel-to-air ratio is increased, and the ignition timing is retarded. All these factors tend to reduce the engine temperature and thereby to reduce any tendency of the engine to detonate.

While I have shown this control system as applied to an air-cooled engine, it should be readily apparent that it could be applied with equal facility to a liquid cooled engine. The pressure drop which measures the cooling air flow could then be taken on the opposite sides of the radiator by which the heat in the cooling fluid is transferred to the air. Alternatively, a restriction in the coolant line could be used to establish a pressure drop which measures the coolant flow.

While I have shown and described a preferred embodiment of my invention, other modifications thereof will readily occur to those skilled in the art, and I therefore intend my invention to be limited only by the appended claims.

I claim as my invention:

1. Control apparatus for an internal combustion engine, comprising means for cooling said engine, means for regulating the effectiveness of said cooling means, mixture control means for regulating the ratio of fuel to air supplied to said engine, first control means responsive to the temperature of said engine, second control means responsive to the rate of flow of cooling air past said engine, third control means responsive to the rate of combustion air flow to said engine, and means including said first, second and third control means for simultaneously controlling both said regulating means.

2. Control apparatus for an internal combustion engine, comprising means external of said engine for cooling said engine, means for regulating the effectiveness of said cooling means, mixture control means for regulating the ratio of fuel to air supplied to said engine, and means for simultaneously controlling both said regulating means so as to enrich the mixture as the effectiveness of the cooling means is increased and to lean the mixture as the effectiveness of the cooling means is decreased.

3. Control apparatus for an internal combustion engine, comprising cowl flaps for regulating the flow of cooling air over said engine, mixture control means for regulating the ratio of fuel to air supplied to said engine, control means responsive to the temperature of said engine, and means including said control means for simultaneously controlling the position of said cowl flaps and said mixture control means to open said flaps and enrich the mixture in response to an increase in engine temperature and to close the flaps and lean the mixture in response to a decrease in engine temperature.

4. Control apparatus for an internal combustion engine, comprising cowl flaps for regulating the flow of cooling air over said engine, mixture control means for regulating the ratio of fuel to air supplied to said engine, control means responsive to the rate of flow of cooling air past said engine, and means including said control means for simultaneously controlling the position of said cowl flaps and said mixture control means to open said flaps and enrich the mixture in response to a decrease in the flow of cooling air past said engine and to close said flaps and lean the mixture in response to an increase in the flow of cooling air past said engine.

5. Control apparatus for an internal combustion engine, comprising cowl flaps for regulating the flow of cooling air over said engine, mixture control means for regulating the ratio of fuel to air supplied to said engine, control means responsive to the rate of combustion air flow to said engine, and means including said control means for simultaneously controlling the position of said cowl flaps and said mixture control means to open said cowl flaps and enrich the mixture in response to an increase in the rate of flow of combustion air to said engine and to close said flaps and lean the mixture in response to a decrease in the rate of flow of combustion air to said engine.

6. Control apparatus for an internal combustion engine, comprising cowl flaps for regulating the flow of cooling air over said engine, mixture control means for regulating the ratio of fuel to air supplied to said engine, means for controlling the ignition timing of said engine, and means for simultaneously controlling said cowl flaps, and said ignition timing control means to simultaneously open said flaps, enrich said mixture and retard said ignition timing or to simultaneously close said flaps, lean said mixture and advance said ignition timing.

7. Control apparatus for an internal combustion engine, comprising cowl flaps for regulating the flow of cooling air over said engine, mixture control means for regulating the ratio of fuel to air supplied to said engine, a throttle for controlling the flow of combustion air to said engine, stop means for limiting the opening movement of said throttle, and means for simultaneously controlling said cowl flaps, said mixture control means, and said stop means to simultaneously open said flaps, enrich said mixture and increasingly limit the opening movement of said throttle or to simultaneously close said flaps, lean said mixture and permit a wider opening movement of said throttle.

8. Control apparatus for an internal combustion engine, comprising cowl flaps for regulating the flow of cooling air over said engine, mixture control means for regulating the ratio of fuel to air supplied to said engine, ignition timing control means for said engine, a throttle for controlling the flow of combustion air to said engine, stop means for limiting the opening movement of said throttle, first control means responsive to the temperature of said engine, second control means responsive to the rate of flow of cooling air past said engine, third control means responsive to the rate of combustion air flow to said engine, and means including said first, second and third control means for simultaneously controlling said cowl flaps, said mixture control means, said ignition timing control means and said throttle stop means to simultaneously open said flaps, enrich said mixture, retard said ignition and increasingly limit the opening movement of said throttle in response to either an increase in engine temperature, a decrease in the rate of flow of cooling air, or an increase in the rate of flow of combustion air.

9. Control apparatus for an internal combustion engine having a passage for cooling air flowing over said engine, baffle means in said passage, means for regulating the flow of air thru said passage, a conduit for combustion air flowing to said engine, means associated with said conduit for producting a difference of pressures indicative of the rate of flow of combustion air thru said conduit, reversible electrical motor means for operating said regulating means, double-throw switch means for controlling said reversible motor means, said switch means comprising two pairs of relatively movable contacts, means for positioning one of said pairs of contacts including two pairs of expansible chambers, a pair of flexible diaphragms, each diaphragm separating one of said pairs of chambers, means for transmitting the pressures on the opposite sides of said baffle means to one of said pairs of chambers, means for transmitting said difference of air pressures from said conduit to the other of said pairs of chambers so that the forces on said diaphragms act in opposition to each other, a connection between said diaphragm and said one pair of contacts, and means responsive to the temperature of said engine for positioning the other pair of contacts.

10. Control apparatus for an internal combustion engine, comprising a conduit for fuel flowing toward said engine, a pair of parallel metering restrictions in said conduit, a first valve, a selector valve movable between a first position wherein only one of said restrictions is open, a second position wherein both said restrictions are open and a third position wherein said one restriction is open and the other restriction is connected in series with said first valve, first control means responsive to the temperature of said engine, second control means responsive to the rate of flow of cooling air past said engine, third control means responsive to the rate of combustion air flow to said engine, means including said first, second and third control means for controlling the position of said first valve, and means responsive to the rate of flow of combustion air to said engine for regulating the fuel pressure differential across said restrictions.

11. Control apparatus for an internal combustion engine, comprising a conduit for fuel flowing toward said engine, a conduit for combustion air flowing to said engine, means associated with said conduits for regulating the fuel-air ratio, first control means responsive to the temperature of said engine, second control means responsive to the rate of flow of cooling air past said engine, third control means responsive to the rate of combustion air flow to said engine, and means including said first, second and third control means for operating said ratio regulating means.

12. Control apparatus for an internal combustion engine, comprising a conduit for fuel flowing toward said engine, a conduit for combustion air flowing to said engine, means associated with said conduits for regulating the fuel-air ratio, control means responsive to the rate of flow of cooling air past said engine, additional control means responsive to the rate of combustion air flow to said engine, and means including both said means for operating said ratio regulating means.

13. Control apparatus for an internal combustion engine, comprising a conduit for fuel flowing toward said engine, a conduit for combustion air flowing to said engine, means associated with said conduits for regulating the fuel-air ratio, control means responsive to the temperature of said engine, additional control means responsive to the rate of combustion air flow to said engine, and means including both said control means for operating said ratio regulating means.

14. Control apparatus for an internal combustion engine, comprising a conduit for fuel flowing toward said engine, a conduit for combustion air flowing to said engine, means associated with said conduits for regulating the fuel-air ratio, control means responsive to the temperature of said engine, additional control means responsive to the rate of flow of cooling air past said engine, means including both said control means for operating said ratio regulating means.

15. Control apparatus for an internal combustion engine, comprising cowl flaps for regulating the flow of cooling air over said engine, first control means responsive to the temperature of said engine, second control means responsive to the rate of flow of cooling air past said engine, third control means proportionally responsive to the rate of combustion air flow to said engine, and means including said first, second and third control means for controlling the position of said cowl flaps.

16. Control apparatus for an internal combustion engine, comprising cowl flaps for regulating the flow of cooling air over said engine, control means responsive to the temperature of said engine, additional control means proportionally responsive to the rate of combustion air flow to said engine, and means including both said control means for controlling the position of said cowl flaps.

17. Control apparatus for an internal combustion engine, comprising cowl flaps for regulating the flow of cooling air over said engine, control means responsive to the rate of flow of cooling air past said engine, additional means proportionally responsive to the rate of combustion air flow to said engine, and means including both said control means for controlling the position of said cowl flaps.

18. Control apparatus for an internal combustion engine, comprising cowl flaps for regulating the flow of cooling air over said engine ignition timing control means, control means responsive to the temperature of said engine, and means including said temperature responsive means for simultaneously retarding the ignition timing and opening said flaps in response to an increase in engine temperature and advancing said timing and closing said flaps in response to a decrease in engine temperature.

19. Control apparatus for an internal combustion engine, comprising ignition timing control means, means responsive to the rate of flow of cooling air past said engine, and means including said cooling air flow responsive means for retarding the ignition timing in response to a decrease in the rate of flow of cooling air past said engine, and advancing said timing in response to an increase in the rate of flow of cooling air past said engine.

20. Control apparatus for an internal combustion engine, comprising a throttle for controlling the flow of combustion air to said engine, stop means for limiting the opening movement of said throttle control, means responsive to the temperature of said engine and said combustion air flow, and means including said control means for increasingly limiting the opening movement of said throttle in response to an increase in engine temperature.

21. Control apparatus for an internal combustion engine, comprising a throttle for controlling the flow of combustion air to said engine, stop means for limiting the opening movement of said throttle, means responsive to the rate of flow of cooling air past said engine, and means including said flow responsive means for increasingly limiting the opening movement of said throttle in response to a decrease in the rate of flow of cooling air past said engine.

22. Control apparatus for an internal combustion engine, comprising cowl flaps for regulating the flow of cooling air over said engine, control means proportionally responsive to the rate of combustion air flow to said engine, and means including said control means for positioning said cowl flaps.

23. Control apparatus for an internal combustion engine, comprising means for regulating the flow of cooling air over said engine, means for positioning said regulating means, and means for controlling said positioning means including a device proportionally responsive to the rate of flow of combustion air to said engine to anticipate temperature changes due to changes in combustion air flow and thereby to prevent such changes by causing anticipatory movement of said regulating means.

24. Control apparatus for an internal combustion engine, comprising means for cooling said engine, means for regulating the effectiveness of said cooling means, mixture control means for regulating the ratio of fuel to air supplied to said engine, and means for simultaneously controlling both said regulating means so as to enrich the mixture as the effectiveness of the cooling means is increased and to lean the mixture as the effectiveness of the cooling means is decreased, said controlling means including a device proportionally responsive to the rate of flow of combustion air to said engine to anticipate temperature changes due to changes in combustion air flow and thereby to prevent such changes by causing anticipatory movement of said controlling means.

25. Control apparatus for an internal combustion engine, comprising cowl flaps for regulating the flow of cooling air over said engine, means responsive to detonation of said engine, and means including said detonation responsive means for positioning said cowl flaps to move said flaps in an opening direction upon detonation of said engine.

26. Control apparatus for an internal combustion engine, comprising means for cooling said engine, means for regulating the effectiveness of said cooling means, mixture control means for regulating the ratio of fuel to air supplied to said engine, and means for simultaneously controlling both said regulating means so as to enrich the mixture as the effectiveness of the cooling means is increased and to lean the mixture as the effectiveness of the cooling means is decreased, said controlling means including means responsive to detonation of said engine.

27. A fuel control device for an internal combustion engine, comprising: a conduit for fuel flowing toward said engine, a first metering restriction in said conduit, metering means in said conduit in parallel with said first metering restriction, said metering means including a second metering restriction and a first valve in series with said second metering restriction; a selector valve and means for operation thereof between a first position wherein flow occurs only thru said first metering restriction, a second position wherein flow occurs directly through said first and second metering restrictions in parallel and by-passes said first valve, and a third position wherein flow occurs thru said first metering restriction and said metering means; means external of said device for gradually varying the position of said first valve to control the flow thru said second metering restriction when said selector valve is in said third position, and means responsive to the rate of flow of combustion air to said engine for regulating the fuel pressure differential across said first metering restriction and said metering means.

28. A fuel control device for an internal combustion engine, comprising a main conduit for fuel flowing to said engine, first and second parallel branch conduits connected by a transverse passage, a selector valve located at the junction of one of said branch conduits and said transverse passage, first and second metering restrictions in the respective branch conduits, a by-pass conduit extending from said main-conduit to said second branch conduit to a point therein between said second restriction and said selector valve, a second valve in said by-pass conduit, means for operating said selector valve between a first position wherein said first branch conduit is open and said second branch conduit and said transverse passage are closed, a second position wherein both said first and second branch conduits and said transverse passage are open, and a third position wherein said first and second branch conduits are open and said transverse passage is closed, means external of said device for gradually varying the position of said second valve to control the flow thru said second metering restriction when said selector valve is in said third position, and means responsive to the rate of flow of combustion air to said engine for regulating the fuel pressure differential between said main conduit portions.

LEIGHTON LEE, II.

REFERENCES CITED

The following references are of record in the file of this patent:

UNITED STATES PATENTS

| Number | Name | Date |
| --- | --- | --- |
| 1,665,307 | Kettering | Apr. 10, 1928 |
| 1,785,902 | Hardman | Dec. 23, 1930 |
| 1,792,785 | Upton et al. | Feb. 17, 1931 |
| 1,838,408 | King et al. | Dec. 29, 1931 |
| 2,072,881 | Holm | Mar. 9, 1937 |
| 2,081,762 | Nissen | May 25, 1937 |
| 2,306,733 | Joslyn | Dec. 29, 1942 |
| 2,361,227 | Mock | Oct. 24, 1944 |
| 2,390,619 | Setterblade | Dec. 11, 1945 |
| 2,391,755 | Twyman | Dec. 25, 1945 |